(12) United States Patent
Woestenborghs et al.

(10) Patent No.: US 9,046,711 B2
(45) Date of Patent: Jun. 2, 2015

(54) DISPLAY DEVICE AND USE THEREOF

(75) Inventors: Wouter Woestenborghs, Ghent (BE);
Arnout Vetsuypens, Denderbelle (BE)

(73) Assignee: BARCO N.V., Kortrijk (BE)

( * ) Notice: Subject to any disclaimer, the term of this patent is extended or adjusted under 35 U.S.C. 154(b) by 389 days.

(21) Appl. No.: 13/144,102

(22) PCT Filed: Jan. 13, 2010

(86) PCT No.: PCT/EP2010/050329
§ 371 (c)(1),
(2), (4) Date: Jul. 12, 2011

(87) PCT Pub. No.: WO2010/081814
PCT Pub. Date: Jul. 22, 2010

(65) Prior Publication Data
US 2011/0273413 A1    Nov. 10, 2011

(30) Foreign Application Priority Data

Jan. 13, 2009 (GB) .................................. 0900469.8

(51) Int. Cl.
*G06F 3/038* (2013.01)
*G02F 1/1335* (2006.01)
*G02F 1/133* (2006.01)

(52) U.S. Cl.
CPC *G02F 1/133603* (2013.01); *G02F 2001/13324* (2013.01); *G02F 2201/58* (2013.01)

(58) Field of Classification Search
CPC ............... G02F 1/133603; G02F 2001/13324; G02F 2201/58
USPC ............. 345/207, 156, 166, 173, 690; 257/79
See application file for complete search history.

(56) References Cited

U.S. PATENT DOCUMENTS

| 5,490,005 | A | 2/1996 | Jueliger |
| 6,617,604 | B2 | 9/2003 | Imai |
| 8,648,794 | B2* | 2/2014 | Nishida .......................... 345/102 |
| 2003/0006980 | A1* | 1/2003 | Brabander et al. ............ 345/207 |

(Continued)

FOREIGN PATENT DOCUMENTS

| CN | 1395230 A | 2/2003 |
| CN | 1682265 A | 10/2005 |

(Continued)

OTHER PUBLICATIONS

EPO communication in corresponding EP application 10 705 561.8-2205 mailed Oct. 1, 2012 (5 pages).

(Continued)

*Primary Examiner* — Thuy Pardo
(74) *Attorney, Agent, or Firm* — Bacon & Thomas, PLLC

(57) ABSTRACT

The display device includes a sensor system with at least one sensor for detecting the intensity or color of light emitted from at least one display area of the display device into the viewing angle of the display device. The sensor system further includes in one embodiment an at least partially transparent sensor. The sensor system includes in another embodiment at least one optical coupling device including a light guide member and a incoupling member for guiding or directing, e.g. deflecting, reflecting, bending, scattering, diffracting, at least one part of the light emitted from the display area to the corresponding sensor, wherein the sensor is located outside or at least partially outside the viewing angle of the display device.

23 Claims, 3 Drawing Sheets

(56) References Cited

U.S. PATENT DOCUMENTS

| | | | |
|---|---|---|---|
| 2003/0047736 A1 | 3/2003 | Hayashi et al. | |
| 2004/0212600 A1* | 10/2004 | Kodama et al. | 345/173 |
| 2005/0243023 A1 | 11/2005 | Reddy et al. | |
| 2006/0007103 A1* | 1/2006 | Oh et al. | 345/102 |
| 2006/0197757 A1* | 9/2006 | Holub | 345/207 |
| 2007/0279374 A1* | 12/2007 | Kimura et al. | 345/102 |
| 2008/0024460 A1* | 1/2008 | Kodama et al. | 345/173 |
| 2009/0102770 A1* | 4/2009 | Iwata et al. | 345/89 |
| 2009/0179881 A1* | 7/2009 | Hibi | 345/207 |
| 2009/0213147 A1* | 8/2009 | Sagardoyburu et al. | 345/690 |
| 2010/0156953 A1* | 6/2010 | Nevitt et al. | 345/690 |

FOREIGN PATENT DOCUMENTS

| | | |
|---|---|---|
| EP | 1274066 | 1/2003 |
| JP | 2001-041852 A | 2/2001 |
| JP | 2002-162934 A | 6/2002 |
| JP | 2002-278506 A | 9/2002 |
| JP | 2003-090780 A | 3/2003 |
| JP | 2003-330383 A | 11/2003 |
| JP | 2004-093648 A | 3/2004 |
| JP | 2004-310116 A | 11/2004 |
| JP | 2005-128089 A | 5/2005 |
| JP | 2007-110094 A | 4/2007 |
| JP | 2008-175958 A | 7/2008 |
| WO | 2004023443 | 3/2004 |
| WO | 2008050262 | 5/2008 |

OTHER PUBLICATIONS

International Search Report in PCT/EP2010/050329, May 11, 2010.
International Preliminary Report on Patentability in PCT/EP2010/050329, Apr. 26, 2011.
Chinese Office Action dated Mar. 25, 2014, for CN 201080007199.0, and English translation thereof.
Japanese Office Action for corresponding JP 2011-544893, dated Oct. 29, 2013, and English translation thereof.
European Office Action for related EP 10705561.8, dated Jan. 16, 2014.
Japanese Office Action dated Sep. 9, 2014, for JP 2011-544893, and English translation thereof.
European Office Action dated Dec. 15, 2014, for EP 10 7050561.8.
Chinese Office Action dated Jan. 13, 2015, for CN 201080007199.0, and English translation thereof.

* cited by examiner

DISPLAY DEVICE AND USE THEREOF

FIELD OF THE INVENTION

The invention relates to a display device having at least one sensor for detecting a property such as the intensity, colour and/or colour point of light emitted from at least one display area of a display device into the viewing angle of said display device.

The invention also relates to the use of such a display device.

BACKGROUND OF THE INVENTION

In modern medical facilities, radiology plays a crucial role in the diagnostic process. Because of this, high-quality medical imaging using display devices like liquid crystal display devices (LCD devices) is more important than ever before. Thereto, display devices are typically provided with a sensor and a controller device coupled thereto. One type of sensor is coupled to a backlight device, for instance comprising light emitting diodes (LEDs), of the LCD device. It aims at stabilizing the output of the backlight device, which inherently varies as a consequence of the use of LEDs therein.

WO2008/050262 discloses one example of such sensor for an LED-based backlight. The backlight device is herein provided with a transparent outcoupling plate overlying its surface from which light is emitted. Structures, such as prismatic grooves, are defined in the outcoupling plate, so as to guide light to a side face, where the sensor is located. Particularly, the outcoupling plate is designed so as to achieve light spreading in addition to the light guiding to a side face. This provides an improved uniformity of the light output of the backlight device. However, a stabilization of merely the backlight is insufficient for obtaining a high-quality display system, such can be for instance applied for medical imaging applications. Moreover, when considering such outcoupling plate in front of a display, light spreading is not desired.

EP1274066B1 discloses a display device wherein the sensing is applied in front of the display. Use is made herein of a light guide, f.i. a waveguide or fibre, to guide a portion of the light output to a sensor outside the viewing angle of the display. Light from a display area comprising a plurality of pixels is inserted into the light guide, for instance at one end of the fibre or into a continuous waveguide. Therewith, the area on the display blocked for light transmission is limited. Particularly, as disclosed in EP1274066, light rays traveling under a large angle to the axis of the light guide can be made to exit the structure, while ambient light cannot enter the light guide. By means of this small acceptance angle, it is avoided that ambient light enters the photodiode sensor without a need for shielding.

However, it is desired to further improve such a sensor system, i.e. sensor and light guide. One implementation shown in EP1274066 is that a end of a fibre is parallel to the output surface of the display and the fibre is bent. This is however not a most practical implementation.

Another such solution with a waveguide in front of a display is disclosed in WO2004/023443. The waveguide particularly includes a material of relatively higher refractive index surrounded by a material of relatively lower refractive index. A sensor is present at one edge of the waveguide. Alternatively, the waveguide may extend in four directions and the sensors may be present on four edges. This solution is intended (see example 3) for calibration measurements of an 10×10 passive matrix OLED display, wherein each pixel is turned on sequentially.

However, it is an object of the present invention to provide a sensor system that can be used for real-time measurements, e.g. while the display is in use. The solution of WO2004023443 seems not to be fit therefore. This solution is sensitive to receiving light from the ambient, such that the overall signal to noise ratio will be rather low.

It is therefore an object of the invention to provide a display device with a sensor suitable for real-time sensing (e.g. while the display is in use), with a high signal to noise ratio and without disturbance of an image emitted by the display.

SUMMARY OF THE INVENTION

According to a first aspect of the invention, a display device is provided that comprises at least one display area provided with a plurality of pixels. For each display area an at least partially transparent sensor for detecting a property of light emitted from the said display area into a viewing angle of the display device is present. The sensor is located in a front section of said display device in front of said display area.

Surprisingly good results have been obtained with at least partially transparent sensors located in front of the display area and within the viewing angle. An expected disturbance of the display image tends to be at least substantially absent. Due to the direct incoupling of the light into the sensor, a proper transmission to the sensor is achieved without a coupling member. Such transparent sensor is suitably applied to an inner face of a cover member.

The transparent cover member may be used as a substrate in the manufacturing of the sensor. Particularly a glass or the like inorganic substrate has sufficient thermal stability to withstand operating temperature of vapour deposition, which is a preferred way of deposition of the layers constituting the sensor. Specific examples include chemical vapour deposition (CVD) and any type thereof such as metal organic chemical vapour deposition (MOCVD), thermal vapour deposition. However, polymeric substrates may be used alternatively, particularly when using low temperature deposition techniques such as printing and coating. Assembly is not excluded as a manufacturing technique.

In a suitable embodiment hereof, the device further comprises at least partially transparent electrical conductors for conducting a measurement signal from said sensor within said viewing angle for transmission to a controller. Substantially transparent conductor materials such as indium tin oxide and the polymeric Poly(3,4-ethylenedioxythiophene) poly(styrenesulfonate), typically referred to as PEDOT:PSS, are known per se. In one most suitable embodiment, the sensor is provided with transparent electrodes that are defined in one layer with the said conductors. This reduces the number of layers that inherently lead to additional resistance and to interfaces that might slightly disturb the display image.

Preferably, the sensor comprises an organic photoconductor. Such organic materials have been a subject of advanced research over the past decades. Organic photoconductors may be embodied as single layers, as bilayers and as multilayer structures. They may be advantageously applied within the present display device. Particularly, the presence on the inner face of the cover member allows that the organic materials are present in a closed and controllable atmosphere, e.g. in a space between the cover member and the display. A getter may for instance be present to reduce negative impact of humidity. Furthermore, vacuum conditions or a predefined atmosphere (for instance pure nitrogen) may be applied in said space upon assembly of the cover member to the display.

A sensor comprising an organic photoconductor suitably further comprises a first and a second electrode, that advantageously are located adjacent to each other. The location adjacent to each other, preferably defined within one layer, allows a design with finger-shaped electrodes that are mutually interdigitated. Herewith, any charge generated in the photoconductor is suitably transmitted to the electrodes. Preferably the number of fingers per electrode is larger than 50, more preferably larger than 100, for instance in the range of 250-2000.

One preferred type of photosensor is one wherein the organic photoconductor is a bilayer structure with a exciton generation layer and a charge transport layer, said charge transport layer being in contact with a first and a second electrode. Such a bilayer structure is for instance known from Applied Phys Letters 93 (2008), 63305, which is included herein by reference.

Alternatively, use may be made of thinned silicon photodiodes. When thinning silicon to a micrometer range thickness, it becomes, at least partially, optically transparent. Stability of such devices may be obtained by encapsulation of the devices with a polymeric material such as polyimide. The overall thickness of the encapsulated devices is typically in the order of 3-30 microns The technology is for instance known from R. Dekker et al, 'A 10 μm thick RF-ID tag for chip-in-paper applications', IEEE BCTM Proceedings 2005, 18-21, which is included herein by reference. The photodiodes made in this technology may be assembled to the cover member by means of an adhesive. An electrically conductive adhesive may be applied. Alternatively, transfer may be arranged with capacitive coupling by appropriate positioning of electrodes.

The display defined in the at least one display area of the display device may be of conventional technology, such as an liquid crystal device (LCD) with a backlight, for instance based on light emitting diodes (LEDs), or an electroluminescent device such as an organic light emitting (OLED) display. The display device suitably further comprises an electronic driving system and a controller receiving optical measurement signals generated in the at least one sensor and controlling the electronic driving system on the basis of the received optical measurement signals.

According to a second aspect of the invention, a display device is provided that comprises at least one display area with a plurality of pixels. For each display area, at least one sensor and an at least partially transparent optical coupling device are provided. The at least one sensor is designed for detecting a property of light emitted from the said display area into a viewing angle of the display device. The sensor is located outside or at least partially outside the viewing angle. The at least partially transparent optical coupling device is located in a front section of said display device. It comprises a light guide member for guiding at least one part of the light emitted from the said display area to the corresponding sensor. The coupling device further comprises an incoupling member for coupling the light into the light guide member.

It is an advantage of the present invention to detect a property such as the intensity or the colour of light emitted by at least one display area of a display device into the viewing angle of said display device without constraining the view on said display device. The use of the incoupling member solves the apparent contradiction of a waveguide parallel to the front surface that does not disturb a display image, and a signal-to-noise ratio sufficiently high for allowing real-time measurements. An additional advantage is that any scattering eventually occurring at or in the incoupling member, is limited to a small number of locations over the front surface of the display image.

Preferably, the light guide member is running in a plane which is parallel to a front surface of the display device. The incoupling member is suitably an incoupling member for laterally coupling the light into the light guide member of the coupling device. The result is a substantially planar incoupling member. This has the advantage of minimum disturbance of displayed images. Furthermore, the coupling device may be embedded in a layer or plate. It may be assembled to a cover member, i.e. front glass plate, of the display after its manufacturing, for instance by insert or transfer moulding. Alternatively, the cover member is used as a substrate for definition of the coupling member.

In one implementation, a plurality of light guide members is arranged as individual light guide members or part of a light guide member bundle. It is suitable that the light guide member is provided with a circular or rectangular cross-sectional shape when viewed perpendicular to the front surface and perpendicular to a main extension of the light guide member. A light guide with such a cross-section may be made adequately, and moreover limits scattering of radiation. In one suitable embodiment, such light guide member is located between a first and a second display area. This further reduces the risk of scattering. Such location between a first and a second display area may particularly be used, if the light guide member is defined in or on a cover member. Such cover member is typically a transparent substrate, for instance of glass or polymer material.

In any of the above embodiments the sensor or the sensors of the sensor system is/are located at a front edge of the display device.

The incoupling member of this embodiment may be present on top of the light guide member or effectively inside the light guide member. One example of such location inside the light guide is that the incoupling member and the light guide member have a co-planar ground plane. The incoupling member may then extend above the light guide member or remain below a top face of the light guide member or be coplanar with such top face. Furthermore, the incoupling member may have an interface with the light guide member or may be integral with such light guide member In one particular embodiment, the or each incoupling member is cone-shaped. The incoupling member herein has a tip and a ground plane. The ground plane preferably has circular or oval shape. The tip is preferably facing towards the display area.

The incoupling member may be formed as a laterally prominent incoupling member. Most preferably, it is delimited by two laterally coaxially aligned cones, said cones having a mutual apex and different apex angles. The difference between the apex angles $\Delta\alpha=\alpha1-\alpha2$ is smaller than the double value of the critical angle $(\theta_c)$ for total internal reflection (TIR) $\Delta\alpha<2\theta_c$. Especially, the or each incoupling member fades seamlessly to the guide member of the coupling device. The or each incoupling member and the or each guide member are suitably formed integrally.

In an alternative embodiment, the or each incoupling member is a diffraction grating. The diffraction grating allows that radiation of a limited set of wavelengths is transmitted through the light guide member. Different wavelengths (e.g. different colours) may be incoupled with gratings having mutually different grating periods. The range of wavelengths is preferably chosen so as to represent the intensity of the light most adequately.

In a further embodiment hereof, both the cone-shaped incoupling member and diffraction grating are present as incoupling members. These two different incoupling members may be coupled to one common light guide member or to separate light guide members, one for each, and typically leading to different sensors.

By using a first and a second incoupling members of different type on one common light guide member, light extraction, at least of certain wavelengths, may be increased, thus further enhancing the signal to noise ratio. Additionally, because of the different operation of the incoupling members, the sensor may detect more specific variations.

By using a first and a second incoupling member of different type in combination with a first and a second light guide member respectively, the different type of incoupling members may be applied for different type of measurements. For instance, one type, such as the cone-shaped incoupling member, may be applied for luminance measurements, whereas the diffraction grating or the phosphor discussed below may be applied for color measurements. Alternatively, one type, such as the cone-shaped incoupling member, may be used for a relative measurement, whereas an other type, such as the diffraction grating, is used for an absolute measurement. In this embodiment, the one incoupling member (plus light guide member and sensor) may be coupled to a larger set of pixels than the other one. One is for instance coupled to a display area comprising a set of pixels, the other one is coupled to a group of display areas.

In a further embodiment, the incoupling member further comprises a transformer for transforming a wavelength of light emitted from the display area into a sensing wavelength. The transformer is for instance based on a phosphor. Such phosphor is suitably locally applied on top of the light guiding member. The phosphor may alternatively be incorporated into a material of the light guiding member. It could furthermore be applied on top of another incoupling member (e.g. on top of or in a diffraction grating or a cone-shaped member or another incoupling member).

The sensing wavelength is suitably a wavelength in the infrared range. This range has the advantage the light of the sensing wavelength is not visible anymore. Incoupling into and transport through the light guide member is thus not visible. In other words, any scattering of light is made invisible, and therewith disturbance of the emitted image of the display is prevented. Such scattering could for instance occur directly after the transformation of the wavelength of the light, i.e. upon reemission of the light from the phosphor. The sensing wavelength is most suitably a wavelength in the near infrared range, for instance between 0.7 and 1.0 micrometers, and particularly between 0.8 and 0.9 micrometers. Such a wavelength can be suitably detected with a commercially available photodetectors, for instance based on silicon.

A suitable phosphor for such transformation is for instance a Manganese Activated Zinc Sulphide Phosphor. Such a phosphor may emit luminescence in the 3 micron region, where the manganese concentration is greater than 2%. Optical absorption measurements hereof show a maximum at 0.80 microns with sub-bands at 0.74 micron and 0.84 microns, the luminescence being excited by radiation in this region. Also other rare earth doped zinc sulfide phosphors can be used for infrared (IR) emission. Examples are $ZnS:ErF3$ and $ZnS:NdF3$ thin film phosphors, such as disclosed in J. Appl. Phys. 94 (2003), 3147, which is incorporated herein by reference. Another example is $ZnS:Tm_xAg_y$, with x between 100 and 1000 ppm and y between 10 and 100 ppm, as disclosed in U.S. Pat. No. 4,499,005.

The display device suitably further comprises an electronic driving system and a controller receiving optical measurement signals generated in the at least one sensor and controlling the electronic driving system on the basis of the received optical measurement signals.

The display defined in the at least one display area of the display device may be of conventional technology, such as an liquid crystal device (LCD) with a backlight, for instance based on light emitting diodes (LEDs), or an electroluminescent device such as an organic light emitting (OLED) display.

Instead of being an alternative to the before mentioned transparent sensor solution, the present sensor solution of coupling member and sensor may be applied in addition to such sensor solution. The combination enhances sensing solutions and the different type of sensor solutions have each their benefits. The one sensor solution may herein be coupled to a larger set of pixels than another sensor solution.

While the foregoing description refers to the presence of at least one display area with a corresponding sensor solution, the number of display areas with a sensor is preferably larger than one, for instance two, four, eight or any plurality. It is preferable that each display area of the display is provided with a sensor solution, but that is not essential. For instance, merely one display area within a group of display areas could be provided with a sensor solutions.

In a further aspect according to the invention, use of the said display devices for sensing a light property while displaying an image is provided.

Most suitably, the real-time detection is carried out for the luminance. The detection of color (chrominance) aspects may be carried out in a calibration mode, e.g. when the display is not in a display mode. However, it is not excluded that chrominance detection may also be carried out real-time, in the display mode. It is suitable to do the measurements relative to a reference. The reference can be chosen as a test image or a start-up image of the display.

For an appropriate real-time sensing while display of images in ongoing, further processing on sensed values is suitably carried out. Therein, an image displayed in a display area is used for treatment of the corresponding sensed value or sensed values. Aspects of the image that are taken into account, are particularly its light properties, and more preferably light properties emitted by the individual pixels or an average thereof. One example of such light property is the luminance value, that will be used hereinafter for clarity. Same or similar processing may be done for other light properties such as chrominance, color variations, color balance, . . . .

An algorithm may define an average of those luminance values per display area, based on digital driving levels provided to the display. When comparing to the real light emission of a pixel or a group of pixels, instead of the light emitted theoretically at the used display area, it turns out more difficult to measure the actual non-idealities of the emitted light later on. In defining the average, it may be taken into account that the light is emitted in a specific intensity over a range of angles. More specifically, a luminance profile may be taken into account. The average calculated can be considered to be an ideally emitted luminance.

The luminance value sensed by the sensor is then compared to said ideally emitted luminance. Suitably, the luminance value sensed by the sensor is prior to said comparison or subsequent to said comparison compared to a reference. The two steps of comparison with the emitted luminance value and a reference value provide a sensing result.

In one embodiment, such sensing result is compared by a controller to a lower and/or an upper value of the threshold. If the sensing result is outside the accepted range of values, it is to be reviewed or corrected. One possibility for review is that one or more subsequent sensing results for the display area are calculated and compared by the controller. If more than a critical number of sensing values for one display area are outside the accepted range, then the luminance setting for the display area is to be corrected so as to bring it within the accepted range. A critical number is for instance 7 out of 10. E.g. if 8, 9 or 10 of sensing values are outside the accepted range, the controller takes action. Else, if the number of sensing values outside the accepted range is above a monitoring value but not higher than the critical value, then the controller may decide to continue monitoring.

In order to balance processing effort, the controller may decide not to review all sensing results continuously, but to do this one after the other. Furthermore, this comparison process may be scheduled with a relatively low priority, such that it is only carried out when the processor is idle.

In another embodiment, such sensing result is stored in a memory. At the end of a monitoring period, such set of sensing results may be evaluated. One suitable evaluation is to find out whether the sensed values of the luminance are systematically above or below the value that, according to the settings specified by the controller, had been emitted. If such systematic difference exists, the settings specified by the controller may be adapted accordingly. In order to increase the robustness of the set of sensing results, certain sensing results may be left out of the set, such as for instance an upper and a lower value. Additionally, it may be that values corresponding to a certain display setting are looked at. For instance, sensing values corresponding to a high luminance setting are looked at only. This may be suitable to verify if the display behaves at high luminance settings similar to its behaviour at other settings, for instance low luminance settings. Alternatively, the sensed values of certain luminance settings may evaluated as these values are most reliable for reviewing luminance settings. Instead of high and low values, one may think of luminance when emitting a predominantly green image versus the luminance when emitting a predominantly yellow image. Furthermore, one may think of luminance for a setting in which substantially all pixels of a display area under monitoring have similar or same luminance values versus a setting in which said pixels have mutually different luminance values.

Additional calculations can be based on said set of sensed values. For instance, instead of merely determining a difference between sensed value and setting, the derivative may be reviewed. This can then be used to see whether the difference increases or decreases. Again, the timescale of determining such derivative may be smaller or larger, preferably larger, than that of the absolute difference. It is not excluded that average values are used for determining the derivative over time.

Another use is sets of sensed values for different display areas are compared to each other. In this manner, homogeneity of the display emittance (e.g. luminance) can be calculated.

It will be understood by the skilled reader, that use is made of storage of display settings and sensed values for the said processing and calculations. An efficient storage protocol may be further implemented by the skilled person. It is repeated that the above explanation is given for the example of luminance, but that it may be equally applied to other light properties.

As specified above, the initially sensed value is suitably compared to a reference value for calibration purposes. The calibration will be typically carried out per display area. In the case of using a display with a backlight, the calibration typically involves switching the backlight on and off, for a display area and suitably one or more surrounding display areas. In case of using a display without backlight, the calibration typically involves switching the display off, within a display area and suitably surrounding display areas. The calibration is for instance carried out for a first time upon start up of the display. It may subsequently be repeated for display areas. Moments for such calibration during real-time use which do not disturb a viewer, include for instance short transition periods between a first block and a second block of images. In case of consumer displays, such transition period is for instance an announcement of a new and regular program, such as the daily news. In case of professional displays, such as displays for medical use, such transition periods are for instance periods between reviewing a first medical image (X-ray, MRI and the like) and a second medical image. The controller will know or may determine such transition period.

As discussed hereinabove, different type of incoupling members may be applied for sensing different light properties. Typical light properties that may be sensed separately include a luminance profile, a chrominance strength.

While the above method has been expressed in the claims as a use of the above mentioned sensor solutions, it is to be understood that the method is also applicable to any other sensor for a display that may be used for real-time measurements. It is more generally a method of evaluating at least one value determined by a sensor, comprising the steps of:

Providing a sensing result by:

Calculating a setting-independent sensor value by comparison of the value determined by the sensor for a specified display area with (average) display settings for said display area corresponding to the moment in time on which the sensor determination is based, and Calibrating said value determined by the sensor or said setting-independent sensor value by comparison to a reference value Evaluating the sensing result and/or evaluating a set of sensing results for defining a display evaluation parameter;

If the display evaluation parameter is outside an accepted range, modify the display settings and/or continue monitoring said display area.

The average display settings as used herein are more preferably the ideally emitted luminance as discussed above.

These and other aspects of the invention will be apparent from and elucidated with reference to the embodiments described hereinafter.

DESCRIPTION OF THE ILLUSTRATIVE EMBODIMENTS

Figure 1:
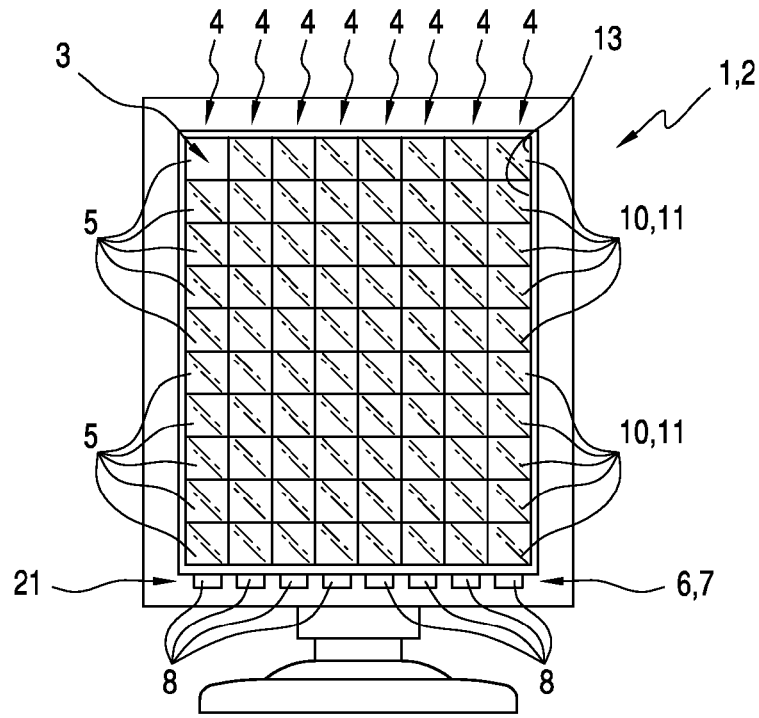
FIG. 1 is a schematic illustration of a display device with a sensor system according to a first embodiment of the invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Similarly, it is to be noticed that the term "coupled", also used in the claims, should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

It is furthermore observed that the term "at least partially transparent" as used throughout the present application refers to an object that may be partially transparent for all wavelengths, fully transparent for all wavelengths, fully transparent for a range of wavelengths or partially transparent for a range of wavelengths. Typically, it refers to optically transparency, e.g. transparency for visible light. Partially transparent is herein understood as the property that the intensity and/or resolution of an image shown through the said partially transparent member is reduced due to the said partially transparent member. Partially transparent refers particularly to a reduction of impinging light intensity of at most 50%, more preferably at most 25%, more preferably at most 10%, or even at most 5%. Typically the members are chosen so as to be substantially transparent, i.e. with a reduction of at most 10%.

The term 'light guide' is used herein for reference to any structure that may guide light in a predefined direction. One preferred embodiment hereof is a waveguide, e.g. a light guide with a structure optimized for guiding light. Typically, such a structure is provided with surfaces that adequately reflect the light without substantial diffraction and/or scattering. Such surfaces may include an angle of substantially 90 or 180 degrees with respect to each other. Another embodiment is for instance an optical fiber. Prismatic structures are deemed less beneficial as they tend to scatter any emitted light and therewith lead to visible disturbance of the emitted image.

Moreover, the term 'display' is used herein for reference to the functional display. In case of a liquid crystalline display, as an example, this is the layer stack provided with active matrix or passive matrix addressing. The functional display is subdivided in display areas. An image may be displayed in one or more of the display areas. The term 'display device' is used herein to refer to the complete apparatus, including sensors, light guide members and incoupling members. Suitably, the display device further comprises a controller, driving system and any other electronic circuitry needed for appropriate operation of the display device.

FIG. 1 shows a display device 1 formed as a liquid crystal display device (LCD device) 2. Alternatively the display device is formed as a plasma display devices or any other kind of display device emitting light. The display 3 of the display device 1 is divided into a number of groups 4 of display areas 5, wherein each display area 5 comprises a plurality of pixels. The display device 3 of this example comprises eight groups 4 of display areas 5; each group 4 comprises in this example ten display areas 5. Each of the display areas 5 is adapted for of emitting light into a viewing angle of the display device to display an image to a viewer in front of the display device 1.

Figure 2:
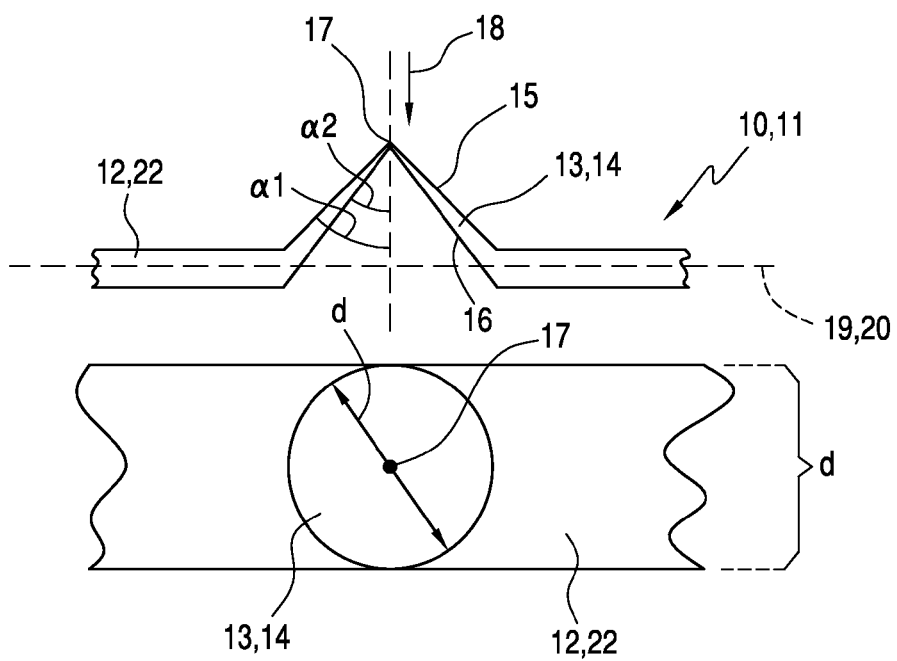
FIG. 2 shows the coupling device of the sensor system illustrated in FIG. 1.
Figure 3:
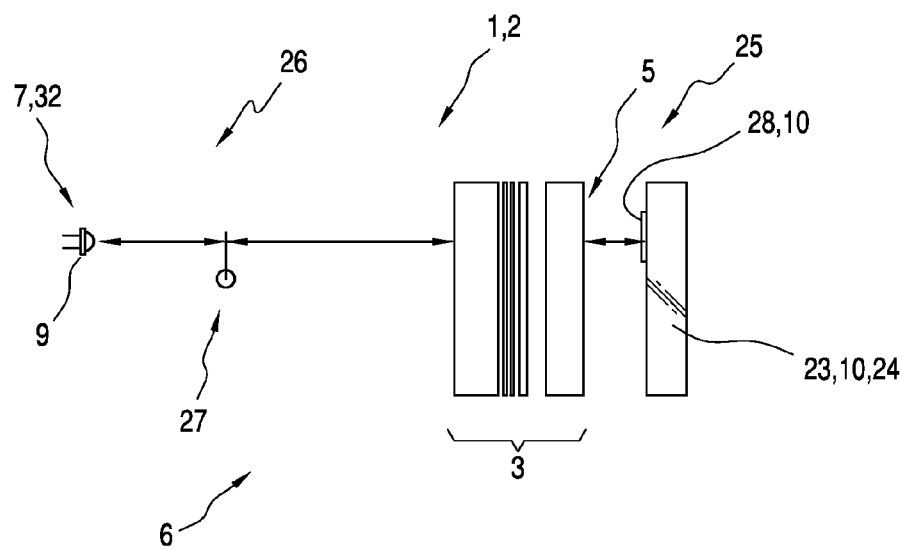
FIG. 3 shows a vertical sectional of a sensor system for use in the display device according to a third embodiment of the invention.
Figure 4:
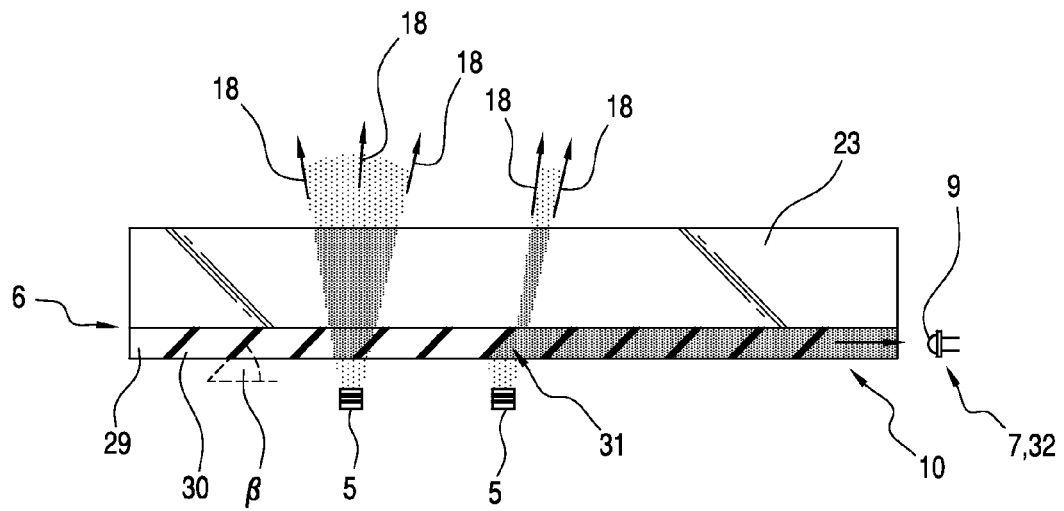
FIG. 4 shows a horizontal sectional view of a display device with a sensor system according to a fourth embodiment of the invention.
Figure 5:
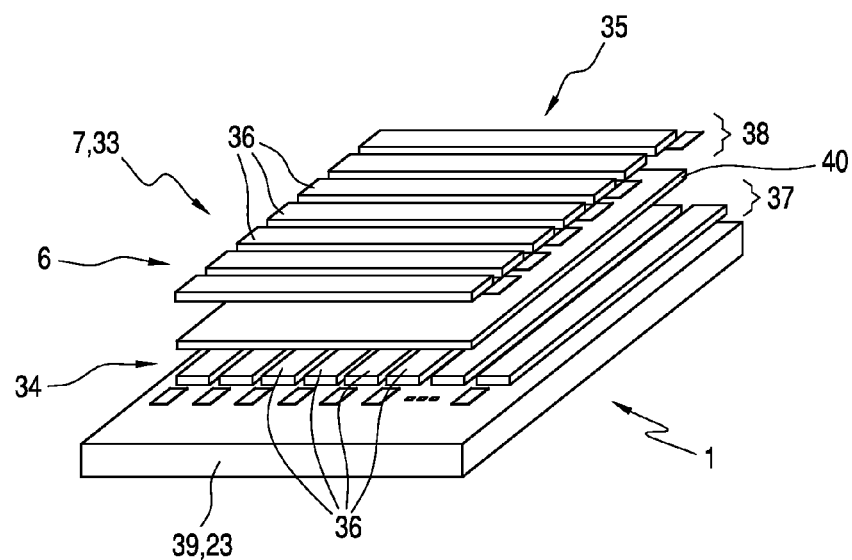
FIG. 5 shows a side view of a display device with a sensor system according to a second embodiment of the invention.

FIG. 1 further shows a sensor system 6 with a sensor array 7 comprising, e.g. eight groups 8 of sensors 9. Each of said groups 8 comprises, e.g. ten sensors 9 (individual sensors 9 are shown in FIGS. 3, 4 and 5) and corresponds to one of the groups 4 of display areas 5. Each of the sensors 9 corresponds to one corresponding display area 5. The sensor system 6 further comprises coupling devices 10 for a display area 5 with the corresponding sensors 9. Each coupling device 10 comprises a light guide member 12 and an incoupling member 13 for coupling the light into the light guide member 12, as shown in FIG. 2. The incoupling member 13 shown in FIG. 2 is cone-shaped, with a tip and a ground plane. It is to be understood that the tip of the incoupling member 13 is facing the display area 5. Light emitted from the display area 5 and arriving at the incoupling member 13, is then refracted at the surface of the incoupling member 13. The incoupling member 13 is formed, in one embodiment, as a laterally prominent incoupling member 14, which is delimited by two laterally coaxially aligned cones 15, 16, said cones 15, 16 having a mutual apex 17 and different apex angles $\alpha 1$, $\alpha 2$. The diameter d of the cones 15, 16 delimiting the incoupling member 13 is equal or almost equal to the width of the light guide member 12. Said light was originally emitted (arrow 18) from the display area 5 into the viewing angle of the display device 1. The direction of this originally emitted light is perpendicular to the alignment of a longitudinal axis 19 of the light guide member 12. All light guide members 12 run parallel in a common plane 20 to the sensor array 7 at one edge 21 of the display device 1. Said edge 21 and the sensor array 7 are outside the viewing angle of the display device 1.

Alternatively, use may be made of a diffraction grating as an incoupling member 13. Herein, the grating is provided with a spacing, also known as period of the grating. The spacing is in the order of the wavelength of the coupled light, particularly between 500 nm and 2 µm. In a further embodiment, a phosphor is used. The size of the phosphor could be smaller than the wavelength of the light to detect.

The light guide members 12 alternatively can be connected to one single sensor 9. All individual display areas 5 can be detected by a time sequential detection mode.

The light guide members 12 are for instance formed as transparent or almost transparent optical fibres 22 (or microscopic light conductors) absorbing just a small part of the light emitted by the specific display areas 5 of the display device 1. The optical fibres 22 should be so small that a viewer does not notice them but large enough to carry a measurable amount of light. The light reduction due to the light guide members and the incoupling structures is about 5% for any display area 5. Waveguides may be applied instead of optical fibres, as discussed hereinafter.

Most of the display devices 1 are constructed with a front transparent plate such as a glass plate 23 serving as a transparent medium 24 in a front section 25 of the display device 1. Other display devices 1 can be made rugged with other transparent media 24 in the front section 25. Suitably, the light guide member 12 is formed as a layer onto a transparent substrate such as glass. A material suitable for forming the light guide member 12 is for instance PMMA (polymethylmethacrylate). Such a material is for instance commercially available from Rohm&Haas under the tradename Lightlink™, with product numbers XP-5202A Waveguide Clad and XP-6701A Waveguide Core. Suitably, a waveguide has a thickness in the order of 2-10 micrometer and a width in the order of micrometers to millimeters. Typically, the waveguide comprises a core layer that is defined between one or more cladding layers. The core layer is for instance sandwiched between a first and a second cladding layer. The core layer is effectively carrying the light to the sensors. The interfaces between the core layer and the cladding layers define surfaces of the waveguide at which reflection takes place so as to guide the light in the desired direction. The incoupling member 13 is suitably defined so as to redirect light into the core layer of the waveguide.

Alternatively, parallel coupling devices 10 formed as fibres 22 with a higher refractive index are buried into the medium 24, especially the front glass plate 23. Above each area 5 the coupling device 10 is constructed on a predefined guide member 12 so light from that area 5 can be transported to the edge 21 of the display device. At the edge 21 the sensor array 7 captures light of each display area 5 on the display device 1. This array 7 would of course require the same pitch as the fibres 22 in the plane 20. While fibres are mentioned herein as an example, another light guide member such as a waveguide, could be applied alternatively.

In FIG. 1 the coupling devices 10 are displayed with different lengths. In reality, full length coupling devices 10 may be present. The incoupling member 13 is therein present at the destination area 5 for coupling in the light (originally emitted from the corresponding display area 5 into the viewing angle of the display device 1) into the light guide member 12 of the coupling device 10. The light is afterwards coupled from an end section of the light guide member 12 into the corresponding sensor 9 of the sensor array at the edge 21 of the display device 1. The sensors 9 preferably only measure light coming from the coupling devices 10.

In addition, the difference between a property of light in the coupling device 10 and that in the surrounding front glass plate 23 is measured. This combination of measuring methods leads to the highest accuracy. The property can be intensity or colour for example.

In one method, each coupling device 10 carries light that is representative for light coming out of a pre-determined area 5 of the display device 1. Setting the display 3 full white or using a white dot jumping from one area to another area 5 gives exact measurements of the light output in each area 5.

However, by this method it is not possible to perform continuous measurements without the viewer noticing it. In this case the relevant output light property, e.g. colour or luminance, should be calculated depending on the image information, radiation pattern of a pixel and position of a pixel with respect to the coupling device 11. Image information determines the value of the relevant property of light, e.g. how much light is coming out of a specific area 5 (for example a pixel of the display 3) or its colour.

Consider the example of optical fibers 22 shaped like a beam, i.e. with a rectangular cross-section, in the plane parallel front glass plate 23, especially a plate 23 made of fused silica. To guide the light through the fibers 22, the light must be travelling in one of the conductive modes. For light coming from outside the fibers 22 or from outside the plate 23, it is difficult to be coupled into one of the conductive modes. To get into a conductive mode a local alteration of the fiber 22 is needed. Such local alteration may be obtained in different manners, but in this case there are important requirements than just getting light inside the fiber 22.

For accurate measuring it is important that only light from a specific direction (directed from the corresponding display area 5 into the viewing angle of the display device) enters into the corresponding coupling device 10 (fiber 22). Light from outside the display device 1 ('noisy' light) will not interfere with the measurement.

Additionally, it is important that upon insertion into the light guide member, f.i. fiber or waveguide, the image displayed is hardly, not substantially or not at all disturbed.

According to the invention, use is made of an incoupling member 13 for coupling light into the light guiding member. The incoupling member 13 is a structure with limited dimensions applied locally at a location corresponding to a display area. The incoupling member 13 has a surface area that typically much smaller than that of the display area, for instance at most 1% of the display area, more preferably at most 0.1% of the display area. Suitably, the incoupling member is designed so as to be laterally prominent, i.e. it leads light to a lateral direction.

Additionally, the incoupling member may be designed to be optically transparent in at least a portion of its surface area for at least a portion of light falling upon it. In this manner the portion of the image corresponding to the location of the incoupling member is still transmitted to a viewer. If for instance at least 30% of the incoming light in the area of the incoupling member is transmitted, the human eye will automatically correct the slight difference in intensity between the image in the area of the incoupling member and neighbouring areas. As a result, it will not be visible. It is observed for clarity that such partial transparency of the incoupling member is highly preferred, but not deemed essential. Alternatively, the incoupling member may be positioned at a location corresponding to a minor portion of the display area. Such minor portion is for instance in an edge region of the display area, or in an area between a first and a second adjacent pixel. This is particularly feasible if the incoupling member is relatively small, e.g. for instance at most 0.1% of the display area.

In a further embodiment, the incoupling member is provided with a ground plane that is circular, oval or is provided with rounded edges. The ground plane of the incoupling member is typically the portion located at the side of the viewer. Hence, it is most visible. By using a ground plane without sharp edges or corners, this visibility is reduced and any scattering on such sharp edges are prevented.

A perfect separation may be difficult to achieve, but with the sensor system 6 comprising the coupling device 10 shown in FIG. 2 a very good signal-to-noise-ratio (SNR) can be achieved.

FIG. 5 shows a side view of a sensor system 9 according to a second embodiment of the invention. The sensor system of this embodiment comprises transparent sensors 33 which are arranged in a matrix with rows and columns. The sensor 33 is realized as a stack comprising two groups 34, 35 of parallel bands 36 in two different layers 37, 38 on a substrate 39, preferably the front glass plate 23. An interlayer 40 is placed between the bands 36 of the different groups 35, 36. The bands (columns) of the first group 34 are running perpendicular to the bands (rows) of the second group 35. The sensor system 6 divides the display area is into different zones, each with its own optical sensor 9 connected by transparent electrodes.

Suitable materials for the transparent electrodes are for instance ITO (Indium Tin Oxide) and poly-3,4-ethylenedioxythiophene polystyrene acid (known in the art are PEDOT-PSS). This sensor array 7 can be attached to the front glass or laminated on the front glass plate 23 of the display device 2, for instance an LCD.

The interlayer 40 is preferably an organic photoconductor, and may be a monolayer, a bilayer, or a multiple layer structure. Most suitably, the interlayer 40 comprises a exciton generation layer (EGL) and a charge transport layer (CTL). The charge transport layer (CTL) is in contact with a first and a second transparent electrode, between which electrodes a voltage difference may be applied. The thickness of the CTL can be is for instance in the range of 25 to 100 nm, f.i. 50 nm. The EGL layer may have a thickness in the order of 5 to 50 nm, for instance 20 nm. The material for the EGL is a suitably a material known for use as an optically absorptive material in solar cells. It is for instance a perylene derivative. One specific example is 3,4,9,10-perylenetetracarboxylic bisbenzimidazole (PTCBI). The material for the CTL is typically an p-type organic semiconductor material. Various examples are known in the art of organic transistors and hole transport materials for use in organic light emitting diodes. Examples include pentacene, poly-3-hexylthiophene (P3HT), 2-methoxy, 5-(2'-ethyl-hexyloxy)-1,4-phenylene vinylene (MEH-PPV), N,N'-bis(3-methylphenyl)-N,N'-diphenyl-1,1'-biphenyl-4,4'-diamine (TPD). Mixtures of small molecules and polymeric semiconductors in different blends could be used alternatively. The materials for the CTL and the EGL are preferably chosen such that the energy levels of the orbitals (HOMO, LUMO) are appropriately matched, so that excitons dissociate at the interface of both layers. A charge storage layer (CSL) may be present between the CTL and the EGL in one embodiment. Various materials may be used as charge storage layer, for instance based on low molecular organic material and a binder. Such materials are for instance known from U.S. Pat. No. 6,617,604, the contents of which are included herein by reference.

In accordance with the invention, use is made of an at least partially transparent electrode materials. This is for instance ITO. Alternatively, a transparent conductor such as ITO or PEDOT:PSS may be combined with a metal layer sufficiently thin to be at least partially transparent. Suitable metals are for instance Au, Mo, Cr. Suitable thickness of such thin metal layer is particularly in the order of nanometers, for instance of less than 2 nm thickness). When ITO is used instead of gold, the inventors did not expect that the structure would work so well so as to be usable for the monitoring of luminance in a high-end display.

Instead of using a bilayer structure, a monolayer structure can also be used. This configuration is also tested in the referenced paper, with only a CTL. Again, in the paper, the electrodes are Au, whereas we made an embodiment with ITO electrodes, such that a (semi) transparent sensor can be created. Also, we created embodiments with other organic layers, such as PTCDA, with ITO electrodes. The organic photoconductor may be a patterned layer or may be a single sheet covering the entire display. In the latter case, each of the display area 5 will have its own set of electrodes but they will share a common organic photosensitive layer (simple or multiple). The added advantage of a single sheet covering the entire display is that the possible color specific absorption by the organic layer will be uniform across the display. In the case where several islands of organic material are separated on the display, non uniformity in luminance and or color is more difficult to compensate.

In one further implementation, the electrodes are provided with fingered shaped extensions. The extensions of the first and second electrode preferably form an interdigitated pattern. The number of fingers may be anything between 2 and 5000, more preferably between 250 and 2500, suitably between 500 and 1000. The surface area of a single transparent sensor may be in the order of square micrometers but is preferable in the order of square millimeters, for instance between 1 and 1000 square millimeters. One suitable shape is for instance a 1500×10 micrometers size, but a size of for instance 4×6 micrometers is not excluded either.

In connection with said further implementation, it is most suitable to build up the sensor on a substrate with said electrodes. The interlayer 40 therein overlies or underlies said electrodes. In other words, while FIG. 5 shows a design comprising a first and a second electrode layer (columns and bands), a single electrode layer may be sufficient. It however is observed that a sensor of a first and a second electrode with the interlayer may, on a higher level, be arranged in a matrix for appropriate addressing and read out, as known to the skilled person. Most suitably, the interlayer is deposited after provision of the electrodes. The substrate may be provided with a planarization layer.

Optionally, a transistor may be provided at the output of the photosensor, particularly for amplification of the signal for transmission over the conductors to a controller. Most suitably, use is made of an organic transistor. Electrodes may be defined in the same electrode material as those of the photodetector. Alternatively, particularly with a suitable, hidden location of the transistor, use may be made of gold electrodes. A organic field effect transistor device structure with a bottom gate structure, a pentacene semiconductor and parylene dielectric is suitably applied. Vias cut into the parylene allow the photoconductor access to the interdigitated electrode structure.

The interlayer 40 may be patterned to be limited to one display area 5, a group of display areas 5, or alternatively certain pixels within the display area 5. Alternatively, the interlayer is substantially unpatterned. Any color specific absorption by the transparent sensor will then be uniform across the display.

Alternatively, the interlayer 40 may comprise nanoparticles or microparticles, either organic or inorganic and dissolved or dispersed in an organic layer. A further alternative is the an interlayer 40 comprising a combination of different organic materials. As the organic photosensitive particles often exhibit a strongly wavelength dependent sensitive absorption coefficient, such a configuration can result in a less colored transmission spectrum. It may further be used to improve detection over the whole visible spectrum, or to improve the detection of a specific wavelength range Suitably, more than one transparent sensor may be present in a display area 5. Additional sensors may be used for improvement of the measurement, but also to provide different colour-specific measurements. Additionally, by covering substantially the full front surface with transparent sensors, any reduction in intensity of the emitted light due to absorption in the at least partially transparent sensor will be less visible or even invisible.

By constructing the sensor 9 as shown in FIG. 5, the sensor surface of the transparent sensor 30 is automatically divided in different zones. A specific zone corresponds to a specific display area 5, preferably a pixel, and can be addressed by placing the electric field across its columns and rows. The current that flows in the circuit at that given time is representative for the photonic current going through that zone.

This sensor system 6 cannot distinguish the direction of the current. Therefore the current going through the transparent sensor 30 can be either a pixel of the display area 5 or external light. Therefore reference measurements with an inactive backlight device are suitably performed.

Suitably, the transparent sensor is present in a front section between the front glass and the display. The front glass provides protection from external humidity (e.g. water spilled on front glass, the use of cleaning materials, etc.). Also, it provides protection form potential external damaging of the sensor. In order to minimize negative impact of any humidity present in said cavity between the front glass and the display, encapsulation of the sensor is preferred.

FIG. 3 shows another embodiment of the invention relating to a sensor system 6 for rear detection. FIG. 3 is a simplified representation of an optical stack of the display 3 comprising (from left to right) a diffuser, several collimator foils, a dual brightness enhancement film (DBEF) and a LED display element in the front section 25 of a display device 1. At the backside 26 of the display 3 (left side) the sensor 9 of the sensor system 6 is added to measure all the light in the display area 5. A backlight device 27 is located between the sensor 9 and the stack of the display 3. The sensor 9 is counter sunken in a housing element (not shown) so only light close to the normal, perpendicular to the front surface 28, is detected.

The sensor system 6 shown in FIG. 3 can be used for performing an advantageous method for detecting a property of the light, e.g. the intensity or colour of the light emitted from at least one display area 5 of a liquid crystal display device 2 (LCD device) into the viewing angle of said display device 2, wherein said LCD device 2 comprises a backlight device 27 for lighting the display 3 formed as a liquid crystal display member of the display device 2, the method comprising the steps:
Switching off the backlight device 27,
Detecting the light emitted by at least one chosen display area 5 and
Switching on the backlight device 27.

There are three possible ways to do the detection of the light emitted by the at least one chosen display area 5: A very ambitious method is the use of the time of flight principle and measuring only the photons that react at the interface polarizer-air (not shown) at the front section 25 of the display device 1. A second method uses an optical device 10 formed as a mirror 28 in front of the display 3 to achieve the same result but with higher luminance to measure. A third method consists of estimating the escaped energy out of the backlight cavity of the backlight device 27.

FIG. 4 shows a horizontal sectional view of a display device 1 with a sensor system 6 according to a fourth embodiment of the invention. The present embodiment is a scanning sensor system. The sensor system 6 is realized as a solid state scanning sensor system localized the front section 25 of the display device 1. The display device 1 is in this example an liquid crystalline display, but that is not essential. This embodiment provides effectively an incoupling member. The substrate or structures created therein (waveguide, fibers) may be used as light guide members.

In accordance with this embodiment of the invention, the solid state scanning sensor system is a switchable mirror. Therewith, light may be redirected into a direction towards a sensor. The solid state scanning system in this manner integrates both the incoupling member and the light guide member. In one suitable embodiment, the solid state scanning sensor system is based on a perovskite crystalline or polycrystalline material, and particularly the materials family based on leadzirconate titanate. Typical examples of such materials include lead zirconate titanate (PZT), lanthane doped lead zirconate titanate (PLZT), lead titanate (PT), bariumtitanate (BaTiO3), bariumstrontiumtitantate (BaSrTiO3). Such materials may be further doped with rare earth materials and may be provided by chemical vapour deposition, by sol-gel technology and as particles to be sintered. Many variations hereof are known from the fields of capacitors, actuators and microactuators (MEMS).

In one example, use was made of PLZT. An additional layer 29 can be added to the front glass plate 23 and may be an optical device 10 of the sensor system 6. This layer is a conductive transparent layer such as a tin oxide, e.g. preferably an ITO layer 29 (ITO: Indium Tin Oxide) that is divided in line electrodes by at least one transparent isolating layer 30. The isolating layer 30 is only a few microns (µm) thick and placed under an angle β. The isolating layer 30 is any suitable transparent insulating layer of which a PLZT layer (PLZT: lanthanum-doped lead zirconate titanate) is one example. The insulating layer preferably has a similar refractive index to that of the conductive layer or at least an area of the conductive layer surrounding the insulating layer, e.g. 5% or less difference in refractive index. For example, a PLZT layer has almost the same refractive index as the ITO layer 29. The isolating layer 31 is an electro-optical switchable mirror 31 for deflecting at least one part of the light emitted from the display area 5 to the corresponding sensor 9 and is driven by a voltage. The insulating layer can be an assembly of at least one ITO sub-layer and at least one glass or IPMRA sub-layer.

In one further example, a four layered structure was manufactured. Starting from a substrate, f.i. a corning glass substrate, a first transparent electrode layer was provided. This was for instance ITO in a thickness of 30 nm. Thereon, a perovskite layer was grown, in this example by CVD technology. The layer thickness was approximately 1 micrometer. The deposition of the perovskite layer may be optimized with nucleation layers as well as the deposition of several subsequent layers, that do not need to have the same composition. A further electrode layer was provided on top of the perovskite layer, for instance in a thickness of 100 nm. In one suitable example, this electrode layer was patterned in fingered shapes. More than one electrode may be defined in this electrode layer. Subsequently, a polymer was deposited. The polymer was added to mask the ITO finger pattern. When to this structure a voltage is applied between the bottom electrode and the fingers on top of the PZT the refractive index of the PZT under each of the fingers will change. This change in refractive index will result in the appearance of a diffraction pattern. The finger pattern of the top electrode is preferably chosen so that a diffraction pattern with the same period would diffract light into direction that would undergo total internal reflection at the next interface of the glass with air. The light is thereafter guided to sensors through the glass substrate. Therewith, all it is achieved that diffraction orders higher than zero are coupled into the glass and remain in the glass. Optionally, specific light guiding structures, e.g. waveguides may be applied in or directly on the substrate.

While it will be appreciated that the use of ITO is here highly advantageous, it is observed that this embodiment of the invention is not limited to the use of ITO electrodes. Other transparent materials may be used as well. Moreover, partially transparent materials may be applied, particularly for the finger shaped electrode pattern. Furthermore, it is not excluded that an alternative electrode pattern is designed with which the perovskite layer may be switched so as to enable diffraction into the substrate or another light guide member.

The solid state scanning sensor system has no moving parts and is advantageous when it comes to durability. Another benefit is that the solid state scanning sensor system can be made quite thin and doesn't create dust when functioning.

An alternative solution can be the use a reflecting surface or mirror 28 that scans (passes over) the display 3, thereby reflecting light in the direction of the sensor array 7. Other optical devices may be used that are able to deflect, reflect, bend, scatter, or diffract the light towards the sensor or sensors.

The sensor array 7 can be a photodiode array 32 without or with filters to measure intensity or colour of the light. Capturing and optionally storing measured light in function of the mirror position results in accurate light property map, e.g. colour or luminance map of the output emitted by the display 3. A comparable result can be achieved by passing the detector array 9 itself over the different display areas 5.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A display device comprising at least one display area provided with a plurality of pixels, further comprising:
    for each display area, an at least partially transparent sensor for detecting a property of light emitted from the said display area into a viewing angle of the display device,
        wherein said at least partially transparent sensor is partially transparent, said partially transparent referring to a reduction by the at least partially transparent sensor of impinging light intensity of at most 50%,
    which partially transparent sensor is located in a front section of said display device in front of said display area.

2. The display device as claimed in claim 1, comprising at least partially transparent electrical conductors for conducting a measurement signal from said sensor within said viewing angle for transmission to a controller.

3. The display device as claimed in claim 1, wherein the sensor comprises an organic photoconductor.

4. The display device as claimed in claim 3, wherein the organic photoconductor is a bilayer structure with an exciton generation layer and a charge transport layer, said charge transport layer being in contact with a first and a second electrode.

5. The display device as claimed in claim 1, wherein the sensor comprises at least partially transparent electrodes.

6. The display device as claimed in claim 5, wherein the at least partially transparent electrodes comprise an electrically conductive oxide.

7. The display device as claimed in claim 1, wherein said at least one partially transparent sensor is configured to reduce the impinging light intensity by a reduction of light intensity selected from the group consisting of: at most 25%, at most 10%, and at most 5%.

8. A display device comprising:
    a plurality of display areas provided with a plurality of pixels;
    for each display area there is provided:
    at least one partially transparent sensor for detecting a property of light emitted from the said display area into a viewing angle of the display device, wherein said at least one partially transparent sensor is partially transparent, said partially transparent referring to a reduction by the at least one partially transparent sensor of impinging light intensity of at most 50%, said sensor being located outside or at least partially outside the viewing angle;
    an at least partially transparent optical coupling device located in a front section of said display device and comprising a light guide member for guiding at least one part of the light emitted from the said display area to the corresponding sensor; and
    wherein said coupling device further comprises an incoupling member for coupling the light into the light guide member.

9. The display device as claimed in claim 8, wherein the light guide member is included in a plane which extends parallel to a front surface of the display device and wherein the incoupling member comprises an incoupling member for laterally coupling the light into the light guide member of the coupling device.

10. The display device as claimed in claim 8, wherein the light guide member is provided with a spherical or rectangular cross-sectional shape when viewed in a plane normal to the front surface and normal to a main extension of the light guide member.

11. The display device as claimed in claim 8, wherein the incoupling member is cone-shaped.

12. The display device as claimed in claim 11, wherein the incoupling member is formed as a laterally prominent incoupling member, which is delimited by two laterally coaxially aligned cones, said cones having a mutual apex and different apex angles.

13. The display device as claimed in claim 8, wherein the incoupling member is a diffraction grating.

14. The display device as claimed in claim 8, wherein the incoupling member further transforms a wavelength of light emitted from the display area into a sensing wavelength.

15. The display device as claimed in claim 14, wherein the sensing wavelength is in the infrared range.

16. The display device as claimed in claim 14, wherein the incoupling member is provided with a phosphor for said transformation.

17. The display device as claimed in claim 8, wherein the coupling device is part of a cover member having an inner face and an outer face opposed to the inner face, said inner face facing the at least one display area, wherein the coupling device is present at the inner face.

18. The display device as claimed in claim 8, wherein said at least one partially transparent sensor is configured to reduce the impinging light intensity by a reduction of light intensity selected from the group consisting of: at most 25%, at most 10%, and at most 5%.

19. A method of simultaneous display of an image using a display device comprising at least one display area provided with a plurality of pixels, comprising the steps of:
    providing for each display area, an at least partially transparent sensor for detecting a property of light emitted from the said display area into a viewing angle of the display device, locating said at least partially transparent sensor in a front section of said display device in front of said display area, wherein said partially transparent sensor is partially transparent, said partially transparent referring to a reduction by the at least partially transparent sensor of impinging light intensity of at most 50%, and sensing a light property in at least one display area.

20. Method of claim 19, wherein the light property is the luminance and wherein color measurements are sensed by the at least one sensor of the display device in a calibration mode.

21. A method of simultaneous display as claimed in claim 19, wherein said at least one partially transparent sensor is configured to reduce the impinging light intensity by a reduction of light intensity selected from the group consisting of: at most 25%, at most 10%, and at most 5%.

22. A method of simultaneous display using a display device comprising a plurality of display areas provided with a plurality of pixels, comprising the steps of:

providing for each display area at least one sensor for detecting a property of light emitted from the said display area into a viewing angle of the display device, locating said sensor outside or at least partially outside the viewing angle of the display device;

coupling by an at least partially transparent optical coupling device located in a front section of said display device at least one part of the light emitted from the said display area to the corresponding sensor, the coupling comprising a light guide member for guiding said at least one part of the light emitted from the said display area to the corresponding sensor; and wherein said coupling device further comprises the incoupling by an incoupling member the light into the light guide member, and sensing a light property in at least one display area.

23. Method of claim 22, wherein the light property is the luminance and wherein color measurements are sensed by the at least one sensor of the display device in a calibration mode.

* * * * *